US009156020B2

(12) United States Patent
Petruska et al.

(10) Patent No.: US 9,156,020 B2
(45) Date of Patent: Oct. 13, 2015

(54) CARBON PYROLYZATE ADSORBENT HAVING UTILITY FOR $CO_2$ CAPTURE AND METHODS OF MAKING AND USING THE SAME

(71) Applicant: Entegris, Inc., Billerica, MA (US)

(72) Inventors: Melissa A. Petruska, Newtown, CT (US); J. Donald Carruthers, Fairfield, CT (US); Edward A. Sturm, New Milford, CT (US); Shaun M. Wilson, Trumbull, CT (US); Joshua B. Sweeney, Katonah, NY (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 14/672,127

(22) Filed: Mar. 28, 2015

(65) Prior Publication Data
US 2015/0202593 A1   Jul. 23, 2015

Related U.S. Application Data

(63) Continuation of application No. 13/981,376, filed as application No. PCT/US2012/023059 on Jan. 29, 2012, now Pat. No. 9,017,453.

(60) Provisional application No. 61/438,081, filed on Jan. 31, 2011.

(51) Int. Cl.
*B01D 53/04* (2006.01)
*B01J 20/20* (2006.01)
(Continued)

(52) U.S. Cl.
CPC ............... *B01J 20/20* (2013.01); *B01D 53/08* (2013.01); *B01J 20/3078* (2013.01); *B01D 2253/102* (2013.01); *B01D 2257/504* (2013.01)

(58) Field of Classification Search
CPC ............ B01D 2253/102; B01D 2257/504; B01D 2258/0283; B01D 53/02; B01D 53/04; B01D 53/0462; B01D 53/047; B01J 20/20; B01J 20/28004; B01J 20/28011; B01J 20/3078; C07D 211/70; C07D 211/76; C07D 401/12; C07D 409/14; Y02C 10/04; Y02C 10/08

See application file for complete search history.

(56) References Cited

U.S. PATENT DOCUMENTS

| 4,046,709 A | 9/1977 | Yuki |
| 4,063,912 A | 12/1977 | Neely et al. |

(Continued)

FOREIGN PATENT DOCUMENTS

| CN | 101362595 A | 2/2009 |
| CN | 101903081 A | 12/2010 |

(Continued)

OTHER PUBLICATIONS

Jimenez-Cruz, F., et al., "Adsorption of n-Heptane and 2-Methylheptane in the Gas Phase on Polyvinylidene Chloride-Based Microporous Activated Carbon", "Energy and Fuels", Aug. 17, 2007, pp. 2929-2934, vol. 21.

(Continued)

*Primary Examiner* — Christopher P Jones
(74) *Attorney, Agent, or Firm* — Hultquist, PLLC; Steven J. Hultquist; John Pillion

(57) ABSTRACT

A particulate form carbon pyrolyzate adsorbent, having the following characteristics: (a) $CO_2$ capacity greater than 105 cc/gram at one bar pressure and temperature of 273° Kelvin; (b) $CO_2$ Working Capacity greater than 7.0 weight percent; (c) $CO_2$ heats of adsorption and desorption each of which is in a range of from 10 to 50 kJ/mole; and (d) a $CO_2/N_2$ Henry's Law Separation Factor greater than 5. The carbon pyrolyzate material can be formed from a polyvinylidene chloride-based polymer or copolymer, or other suitable resin material, to provide an adsorbent that is useful for carbon dioxide capture applications, e.g., in treatment of flue gases from coal-fired power generation plants.

20 Claims, 7 Drawing Sheets

(51) Int. Cl.
*B01D 53/08* (2006.01)
*B01J 20/30* (2006.01)

(56) References Cited

U.S. PATENT DOCUMENTS

| | | | |
|---|---|---|---|
| 5,071,820 | A | 12/1991 | Quinn et al. |
| 5,104,530 | A | 4/1992 | Maroldo et al. |
| 5,614,459 | A | 3/1997 | Mondragon et al. |
| 5,704,967 | A | 1/1998 | Tom et al. |
| 5,993,766 | A | 11/1999 | Tom et al. |
| 6,030,698 | A | 2/2000 | Burchell et al. |
| 6,309,446 | B1 | 10/2001 | Nakanoya et al. |
| 6,475,461 | B1 | 11/2002 | Ohsaki et al. |
| 9,017,453 | B2 | 4/2015 | Petruska et al. |
| 2004/0107838 | A1 | 6/2004 | Carruthers |
| 2005/0188846 | A1 | 9/2005 | Carruthers |
| 2009/0038477 | A1 | 2/2009 | Abe et al. |
| 2009/0258782 | A1 | 10/2009 | Gogotsi et al. |
| 2010/0142122 | A1 | 6/2010 | Tanaka |
| 2011/0094159 | A1 | 4/2011 | Moeller |

FOREIGN PATENT DOCUMENTS

| | | |
|---|---|---|
| EP | 1064996 A1 | 1/2001 |
| WO | 9744118 A1 | 11/1997 |
| WO | 0224310 A1 | 3/2002 |
| WO | 02068324 A1 | 9/2002 |
| WO | 2009011750 A2 | 1/2009 |
| WO | 2012106218 A2 | 8/2012 |

OTHER PUBLICATIONS

Jung, H., et al., "Pore Structure Characterization of Poly(vinylidene chloride)-Derived Nanoporous Carbons", "Carbon Letters", Oct. 31, 2012, pp. 236-242, vol. 13, No. 4.

CARBON PYROLYZATE ADSORBENT HAVING UTILITY FOR $CO_2$ CAPTURE AND METHODS OF MAKING AND USING THE SAME

CROSS-REFERENCE TO RELATED APPLICATIONS

This application is a continuation under the provisions of 35 USC 120 of U.S. patent application Ser. No. 13/981,376 filed Jul. 24, 2013, which is a U.S. national phase application under the provisions of 35 USC 371 of International Patent Application No. PCT/US12/23059 filed Jan. 29, 2012, which in turn claims the benefit of priority under 35 USC 119 of U.S. Provisional Patent Application 61/438,081 filed Jan. 31, 2011 in the names of Melissa A. Petruska, J. Donald Carruthers, Edward A. Sturm, Shaun M. Wilson, and Joshua B. Sweeney for "CARBON PYROLYZATE ADSORBENT HAVING UTILITY FOR $CO_2$ CAPTURE AND METHODS OF MAKING AND USING THE SAME". The disclosures of U.S. patent application Ser. No. 13/981,376, International Patent Application No. PCT/US12/23059, and U.S. Provisional Patent Application 61/438,081 are hereby incorporated herein by reference, in their respective entireties, for all purposes.

FIELD

The present disclosure relates to a carbon pyrolyzate adsorbent that is useful for carbon dioxide capture, e.g., from $CO_2$-containing gas streams discharged from coal-fired electric power plants, from oil refinery preheaters, from industrial boilers, and the like. The disclosure additionally relates to $CO_2$ capture apparatus utilizing such carbon material and to methods of making and using the carbon pyrolyzate adsorbent.

DESCRIPTION OF THE RELATED ART

There is current and continuing great interest in reducing greenhouse gas emissions from sources that burn fossil fuels. For example, a single coal-burning large-scale commercial electric power plant of typical size can generate 33 million tons of $CO_2$ per year. Eighty percent of worldwide energy needs are currently met through combustion of fossil fuels. This is the primary reason for the increasing level of $CO_2$ in the atmosphere and its influence on climate change.

There is now intense interest in the control of $CO_2$ and other greenhouse gas emissions. The use of electric-powered vehicles suggests a way of limiting $CO_2$ emissions and yet recent reports indicate that the use of such vehicles in the US and UK will have minimal overall impact because most electricity generation comes from coal and oil burning power plants compared to their use in Europe (France and Germany) where nuclear power contributes as much as 60% of the electric power.

There is therefore an urgent need to control $CO_2$ emissions from fossil-fuel burning electricity-generating power plants.

Under the impetus of environmental regulations and environmental concerns, various methods have been proposed for capture and sequestration of carbon dioxide from effluent streams and industrial operations generating same.

A complicating factor in the search for suitable approaches to remove $CO_2$ from effluent streams of power plants and other streams containing $CO_2$ is the presence of other components in such streams that must be accommodated by the materials and techniques used for $CO_2$ removal. In addition to the targeted $CO_2$ species, $CO_2$-containing gas streams may contain substantial amounts of moisture, air, nitrogen, and other large gas-phase molecules resulting from combustion processes, or other industrial operations generating the carbon dioxide in the first instance. Accordingly, the $CO_2$ removal system must not be adversely affected by the presence of these components, e.g., at the elevated temperatures characteristic of power plant effluent streams.

Current approaches being investigated for control of $CO_2$ emissions from electric power plants include (i) cryogenic technology, (ii) amine-based absorbents, (iii) dilute alkali approaches, and (iv) chilled dilute ammonia absorbents, but these methods are sufficiently energy-intensive and expensive that their commercial viability is far from certain. Porous metal-organic framework (MOF) materials are also being investigated, as well as zeolite materials, but zeolite materials are generally poorly suited to $CO_2$ capture due to their selectivity for $H_2O$ over $CO_2$. MOF materials exhibiting high $CO_2$ capacities only at high operating pressures or at low temperatures are not viable since the additional costs of processing that are associated with such operating conditions may gauge the value of any capacity advantages possessed by such materials. Similarly, MOF materials that exhibit high heats of adsorption for $CO_2$ require uneconomical and difficult regeneration conditions (e.g., excessively high temperatures or low pressures). MOF materials exhibiting poor hydrothermal stability or high $H_2O$ uptake are also not viable candidates.

Thus, there is a lack of proven, acceptable $CO_2$ capture materials and processes. Correspondingly, there is a compelling need for materials and processes that can be economically and effectively used to reversibly capture $CO_2$ from flue gas streams containing same.

SUMMARY

The present disclosure relates to a carbon pyrolyzate adsorbent that is useful for carbon dioxide capture, to $CO_2$ capture apparatus utilizing such carbon material, and to methods of making and using the carbon pyrolyzate adsorbent.

In one aspect, the disclosure relates to a carbon adsorbent, having the following characteristics:

(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and
(d) a $CO_2/N_2$ Henry's Law Separation Factor greater than 5.

In another aspect, the disclosure relates to a method of making a carbon material for $CO_2$ capture, said method comprising pyrolyzing a polymeric or copolymeric resin material under conditions that are effective to yield a carbon pyrolyzate material having the following characteristics:

(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and
(d) a $CO_2/N_2$ Henry's Law Separation Factor greater than 5.

In a further aspect, the disclosure relates to a $CO_2$ capture apparatus, comprising a carbon pyrolyzate material of the present disclosure, arranged for contacting $CO_2$-containing fluid under conditions effecting adsorption of $CO_2$ on the carbon pyrolyzate material.

A further aspect of the disclosure relates to a $CO_2$ capture method, comprising contacting a $CO_2$-containing fluid with a carbon pyrolyzate material of the present disclosure, under conditions effecting adsorption of $CO_2$ on the carbon pyrolyzate material.

Other aspects, features and embodiments of the disclosure will be more fully apparent from the ensuing description and appended claims.

DETAILED DESCRIPTION

Figure 2:
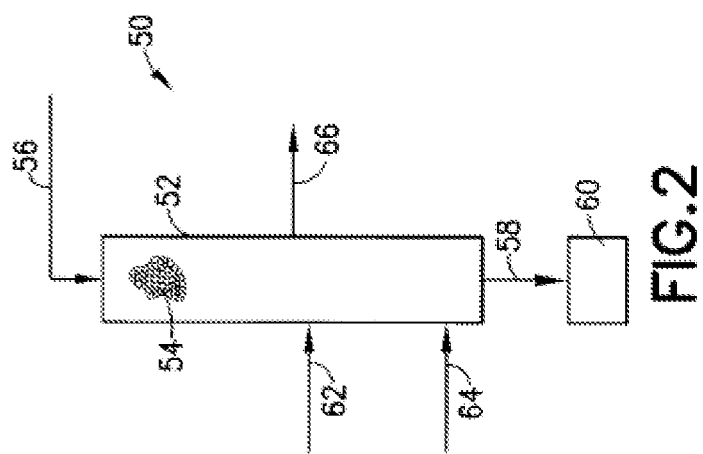
FIG. 2 is schematic representation of a moving bed $CO_2$ capture system in which the adsorbent of the present disclosure can be employed for $CO_2$ capture in processing of $CO_2$-containing gas.

The present disclosure relates to a carbon adsorbent, and more specifically a carbon pyrolyzate adsorbent useful for carbon dioxide capture, and to $CO_2$ capture apparatus utilizing same, as well as to methods of making and using such carbon pyrolyzate adsorbent.

The carbon pyrolyzate adsorbent of the present disclosure is useful for selective adsorption of carbon dioxide, e.g., from environments or gas streams such as flue gases containing carbon dioxide.

The carbon pyrolyzate adsorbent comprises porous amorphous carbon that is highly effective for sorptive uptake and retention of carbon dioxide, and that readily releases carbon dioxide under desorption conditions, such as reduced pressure and/or elevated temperature conditions (relative to adsorption conditions) that may be carried out in pressure swing and/or thermal swing adsorption/desorption apparatus, or by contact of the carbon pyrolyzate adsorbent with a stripping gas, such as steam, nitrogen, argon, etc.

The carbon adsorbent can be of any appropriate form, but preferably is in a bead or particulate form for $CO_2$ capture applications in which the adsorbent is provided in a bed, e.g., a fixed or fluidized bed with which the $CO_2$-containing gas is contacted to effect $CO_2$ capture. Alternatively, the carbon adsorbent can be of monolithic form, e.g., as a unitary solid mass of substantial size that may be of a geometrically regular form, such as a block, brick, disk, or the like, or that may be of a suitable geometrically irregular form.

As used herein and in the appended claims, the singular forms "a", "and", and "the" include plural referents unless the context clearly dictates otherwise.

As used herein and in the appended claims, the term "$CO_2$ Working Capacity" refers to $CO_2$ Working Capacity of the carbon pyrolyzate material, as the difference between the amount of $CO_2$ absorbed at lower temperature of 303° Kelvin by the carbon pyrolyzate material and the amount of $CO_2$ adsorbed at higher temperature at 383° Kelvin from such carbon pyrolyzate material, both amounts being measured at one atmosphere pressure.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure contemplates such features, aspects and embodiments in various permutations and combinations, as being within the scope of the disclosure. The disclosed subject matter may therefore be specified as comprising, consisting or consisting essentially of, any of such combinations and permutations of these specific features, aspects and embodiments, or a selected one or ones thereof, drawing on the entire scope of the present disclosure for any combination or aggregation of features and characteristics disclosed in any portions of the present disclosure.

The carbon pyrolyzate adsorbent of the present disclosure satisfies a number of rigorous criteria for use in $CO_2$ capture applications. It exhibits high reversible $CO_2$ adsorption capacity at ambient temperatures and pressures, fast kinetics, low $H_2O$ adsorption capacity even at high relative humidity and saturated conditions, high selectivity for $CO_2$ over $H_2O$ and $N_2$, low heat of adsorption for ready regeneration at moderate temperatures, stability over a large number of adsorption/regeneration cycles, good hydrothermal stability with high attrition resistance, high bulk density and low cost.

The starting material used to make the carbon pyrolyzate adsorbent of the disclosure may be of any suitable type, including, for example, natural or synthetic polymers or copolymers, or other pyrolyzable material, which are pyrolyzable to form an adsorbent of the desired properties described more fully hereinafter. More specifically, the carbon materials of the present disclosure can be substantially varied, by utilization of resin starting materials containing various co-monomers, or constituted by homopolymers, optionally utilizing various additives, to provide corresponding carbon pyrolyzates that may be subjected to pore modification treatment, activation, etc., to provide a carbon adsorbent of appropriate selectivity, working capacity, and loading characteristics for carbon dioxide in specific $CO_2$ capture applications.

By way of example, the carbon adsorbent can be formed by pyrolysis of homopolymer PVDC, or PVDC-MA copolymer, PVDC-polyvinyl chloride (PVDC-PVC) copolymers, polyfurfuryl alcohol, polyacrylonitrile, polymers containing heteroatoms that upon carbonization are left as dispersed species throughout the carbon material (e.g., polymer precursors such as polyacrylonitrile and polyvinylpyridine, which upon carbonization leave nitrogen atoms scattered throughout the carbon matrix to serve as sites for $CO_2$ coordination, thereby increasing the $CO_2$ sorptive capacity of the carbon material), or any other suitable polymer or copolymer compositions, wherein when copolymer resins are used as pyrolysis starting materials, ratios of comonomers to one another can be varied, and wherein various additives, including plasticizers, sorptive capacity-enhancing agents, metals, reinforcing media, fillers, pyrolysis control agents, etc., optionally can be employed, to provide product carbon adsorbent of a desired character, with respect to pore structure, capacity, surface area, and size of portals that lead to larger cavities in the material. In the latter respect, the portals or constrictions connecting cavities within the pore structure are critical in allowing rapid ingress and egress of $CO_2$, thereby enhancing adsorption and desorption kinetics, and excluding undesired fluid species and particulates from such porosity of the carbon material.

In specific embodiments, the adsorbent is a pyrolyzate of a PVDC homopolymer, or a pyrolyzate of a PVDC copolymer, e.g., a copolymer of an acrylic acid ester such as methyl acrylate (MA). In illustrative PVDC-MA copolymers, the concentration of the MA copolymer in the PVDC-MA material is at a level that is consistent with good porosity, pore size distribution, and $CO_2$ loading capacity of the pyrolyzed carbon adsorbent that is formed by pyrolysis from such copolymer. In various embodiments, the PVDC-MA copolymer can have a weight average molecular weight of at least 80,000, e.g., from 80,000 to 100,000, and more preferably from 85,000 to 96,000.

The carbon pyrolyzate adsorbent, in various embodiments of the disclosure, can have at least the following characteristics:
(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and
(d) a $CO_2/N_2$ Henry's Law Separation Factor greater than 5.

The adsorbent can be of widely varying type, consistent with characteristics such as those described above. In specific embodiments, the adsorbent may for example have an average particle diameter greater than 50 μm. The adsorbents of the disclosure in specific embodiments comprise particles of diameter in a range of from 10 to 500 μm, more preferably in a range of from 150 to 500 μm. The adsorbent in various embodiments comprise particles having a median particle diameter in a range of from 200 to 350 μm. The adsorbent can have a bulk density greater than 0.55 g/mL in still other embodiments. In additional embodiments, the adsorbent is characterized by $CO_2$ heats of adsorption and desorption each of which is in a range of from 20 to 30 kJ/mole.

Carbon pyrolyzate adsorbents within the broad scope of the present disclosure can in specific embodiments have any one or more, or all, of the characteristics of: water adsorptive capacity of less than 5% by weight, based on weight of the adsorbent, at 303° Kelvin and 40% relative humidity; average pore size below 1 nm; porosity at least 50% of the pore volume of which is constituted by pores in a pore size range of from 0.35 to 0.7 nm; porosity characterized by a median pore width below 1 nm; an attrition rate index less than 1 wt %/hr as measured by the procedure of ASTM D 5757, a $N_2$ BET surface area of at least 800 m² per gram, preferably at least 900 m² per gram, and most preferably at least 1000 m² per gram; and $N_2$ micropore volume of at least 0.2 mL per gram, e.g., in a range of from 0.3 to 0.6 mL per gram.

Carbon pyrolyzate adsorbents of the present disclosure exhibit superior $CO_2$ capture recovery and $CO_2$ capture purity. For example, adsorbents in specific embodiments can be characterized by $CO_2$ capture recovery of at least 90% and $CO_2$ capture purity of at least 90%, when contacted with a simulated flue gas composition comprising air containing 15% $CO_2$ and saturated with water vapor, at 383° Kelvin and volumetric flow rate of 100 L/minute of simulated flue gas composition per liter of bed of the adsorbent.

In another aspect, the disclosure relates to a method of making a carbon material for $CO_2$ capture, such method comprising pyrolyzing a polymeric or copolymeric resin material under conditions that are effective to yield a carbon pyrolyzate material having at least the following characteristics:
(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and
(d) a $CO_2/N_2$ Henry's Law Separation Factor greater than 5.

Consistent with the preceding discussion, the resin utilized for such pyrolysis operation can be of any of widely varying types that when pyrolyzed yield the aforementioned characteristics. For example, the resin may comprise a PVDC homopolymer or a PVDC copolymer, e.g., a copolymer of an acrylic acid ester, such as methyl acrylate. In one embodiment, the resin comprises a PVDC-MA copolymer having a weight average molecular weight in a range of from 80,000 to 100,000.

The pyrolysis in the above-described method of making the carbon pyrolyzate adsorbent can be carried out at any suitable operating conditions. The carbon pyrolyzate may be formed by pyrolysis and optional activation at temperatures in a range of from 400° C. to 1200° C. In one embodiment, the pyrolysis is conducted at temperature in a range of from 600° C. to 900° C. under inert atmosphere, e.g., argon or nitrogen. Such pyrolysis may subsequently be optionally followed by exposure of the carbon pyrolyzate material to an oxidizing atmosphere at temperature above 250° C. to produce the adsorbent product. In one embodiment, the carbon material after pyrolysis is exposed to an oxidizing atmosphere, e.g., comprising carbon dioxide, oxygen and/or steam, at temperature above 250° C., such as a temperature in a range of from 600 to 1200° C.

The carbon pyrolyzate in various embodiments has a bulk density of at least 0.55 grams per cubic centimeter, and in other embodiments the carbon pyrolyzate has a bulk density of at least 0.9 g per cubic centimeter. In still other embodiments, the carbon pyrolyzate adsorbent has a bulk density of from about 1.0 to about 2.2 grams per cubic centimeter.

A further aspect of the disclosure relates to a $CO_2$ capture apparatus, comprising a carbon pyrolyzate adsorbent as variously described above, arranged for contacting $CO_2$-containing fluid under conditions effecting adsorption of $CO_2$ on the carbon pyrolyzate adsorbent. The $CO_2$ capture apparatus can comprise a pressure swing, thermal swing, and/or vacuum swing adsorption system, or may alternatively comprise a moving bed contacting system, in which a moving bed of the adsorbent is contacted with a $CO_2$-containing gas mixture, e.g., a coal-fired power plant effluent mixture, to effect removal of $CO_2$ from the gas. The apparatus is advantageously adapted to regenerate the carbon pyrolyzate adsorbent after it has become at least partially loaded with $CO_2$, so that the adsorbent is renewed for subsequent adsorptive operation.

A still further aspect of the disclosure relates to a $CO_2$ capture method, comprising contacting a $CO_2$-containing fluid with a carbon pyrolyzate adsorbent as variously described in different embodiments above, under conditions effecting adsorption of $CO_2$ on the carbon pyrolyzate adsorbent. Such method suitably comprises regenerating the carbon pyrolyzate adsorbent after it has become at least partially loaded with $CO_2$.

The form of the carbon pyrolyzate will depend on the shape or form of the PVDC-MA resin precursor material and its shape or conformation, and subsequent pyrolysis and post-pyrolysis processing. The carbon pyrolyzate may be formed from discrete resin particles of appropriate size, to yield activated carbon particles, granules, beads or the like. The precursor material in other embodiments is pyrolyzed in a vessel or form structure imparting a unitary character to the pyrolyzate material, e.g., so that it is formed as a pyrolyzed monolith of appropriate size and shape characteristics for its desired end use. As specific examples, such carbon monolith may be in the form of a cylinder, block, brick, or other geometrically regular or irregular shape of desired size and character.

In other embodiments, the carbon pyrolyzate adsorbent is in the form of monolithic discs of amorphous carbon char material. A series of such pyrolyzate monoliths may be stacked in serial face-to-face contact, to form a vertically upstanding column structure of the multiple discs that may be reposed in a casing, such as a vessel through which the carbon dioxide-containing gas is flowed for adsorption in the porosity and on the surfaces of the successive disc articles.

Morphologically, the pyrolysis of the preferred polyvinylidene chloride (PVDC) starting material produces porous, non-graphitizing carbon with a highly crosslinked structure. Surface areas of the carbon pyrolyzate adsorbent of the present disclosure are typically greater than 800 m$^2$/g, e.g., in a range of from 800 to 1500 m$^2$ per gram, and nearly all porosity is found in micropores (pores <2 nm in diameter). Consequently, the carbon pyrolyzate adsorbent of the present disclosure exhibits sorptive capacity in a size range that enables such material to store large quantities of $CO_2$.

Carbon pyrolyzate adsorbents of the present disclosure provide high $CO_2$ capacity, e.g., greater than 120 volumes of $CO_2$/volume of carbon pyrolyzate adsorbent as measured at 273° Kelvin and 1 atmosphere pressure, with some embodiments of carbon pyrolyzate adsorbents formed from PVDC homopolymer starting materials exhibiting a $CO_2$ capacity greater than 130 V/V at 273° Kelvin and 1 atmosphere. These levels that are quite remarkable for a porous adsorbent, as evidenced, for example, by reported capacity characteristics of a representative zeolitic imidazolate framework (ZIF) material, ZIF-69, identified as having a high $CO_2$ capacity of 83 volumes of $CO_2$/volume of carbon material as measured at 273° Kelvin and 1 atmosphere pressure; see Science 2008, 319, 939.

In specific embodiments, the carbon pyrolyzate adsorbent may have any of the characteristics variously described herein for carbon pyrolyzate adsorbents of the present disclosure, and/or at least one of the following high-performance characteristics, all such combinations and permutations of the characteristics variously described herein being contemplated for the carbon pyrolyzate adsorbent in specific embodiments of the disclosure.

High $CO_2$ capacity: The carbon pyrolyzate adsorbent advantageously has a high capacity for $CO_2$ adsorption (e.g., at least 20 wt % at 1 atm $CO_2$) and good selectivity for $CO_2$ over other flue gas components.

Rapid adsorption and desorption rates: The adsorption of $CO_2$ advantageously occurs on the micropores of the carbon pyrolyzate adsorbent with very low activation energy (<5 kJ/mole), allowing rapid cycling of the adsorbent.

Low heat of adsorption and desorption: Relatively low heats (25 to 28 kJ/mole) of adsorption and desorption can be provided by the carbon pyrolyzate adsorbent, consistent with a $CO_2$ capture process having a low heat demand for regeneration and low cooling requirements.

High hydrothermal stability: Direct heating of the carbon pyrolyzate adsorbent with steam can be used to effect $CO_2$ desorption. The carbon pyrolyzate adsorbent regenerated at the elevated temperature can be cooled by evaporative cooling of moisture adsorbed on the adsorbent. Direct heating and cooling limit the need for gas-to-solid heat exchangers, simplifying the $CO_2$ capture process.

Mechanical robustness for long lifetime: The carbon pyrolyzate adsorbent lifetime is advantageously much longer than a year, for a $CO_2$ capture process utilizing 50,000 adsorption/desorption cycles per year.

Spherical morphology of the sorbent granules: The carbon pyrolyzate adsorbent may usefully employ spherical adsorbent granules (e.g., 100 to 300 μm in diameter) allowing a smooth flow of the granules on an inclined surface, like a ball bearing. This free-flowing, liquid-like characteristic allows adaptation and the use of economical structural packing as a gas-solid contacting device, to provide a simple, reliable, and efficient design of the $CO_2$ capture system.

Resistance to agglomeration at the operating temperature: The carbon pyrolyzate adsorbent particles advantageously do not stick to each other or sinter at 100° C. and so agglomeration of the sorbent granules is unlikely in the use of the adsorbent for $CO_2$ capture applications.

Low heat capacity: The carbon pyrolyzate adsorbent of the disclosure may have a low heat capacity (e.g., 1 J/g/K), as compared to that of water, which minimizes the thermal energy needed to heat the adsorbent to regeneration temperature.

High thermal conductivity: The carbon pyrolyzate adsorbent of the disclosure may have a thermal conductivity of suitable value, e.g., 0.8 w/m-K, to enable rapid thermal equilibrium between the surface and interior of the adsorbent particles.

Hydrophobicity: The carbon pyrolyzate adsorbent of the disclosure is essentially hydrophobic, indicating that very little interaction between condensed water and the adsorbent will occur. The thermal energy required to desorb condensed water from such adsorbent is significantly less than that required to evaporate water from oxide surfaces such as those found in molecular sieves (zeolites), alumina, and silica.

The disclosure contemplates carbon pyrolyzate materials having $CO_2$ capacity of at least 100 volumes of $CO_2$/volume of carbon material, as measured at 273° Kelvin and 1 atmosphere pressure.

An illustrative carbon pyrolyzate adsorbent useful for such $CO_2$ capture applications may for example have a surface area 1030 m$^2$ per gram, a micropore volume of 0.4 mL per gram, a bulk density of 0.68 g/mL, a compressive strength of 22 Kpsi, an attrition of <0.01%/hour, and the thermal conductivity of 0.82 W/m-K.

Preferred carbon adsorbents of the present disclosure are >40% by volume micropores, with significant pore volume in pores <0.7 nm. Such combination of high micropore volume and predominance of ultramicropores enhances $CO_2$ uptake at low partial pressures. The carbon adsorbents of the present disclosure have high selectivity for adsorption of $CO_2$ in relation to nitrogen, e.g., a separation factor greater than 6 for $CO_2$ over $N_2$, e.g., in a range of from 6.2 to 7.5. Permeability of such carbon adsorbents may be greater than 900 cc/psi/cm$^2$/min, e.g., in a range of from 910 to 1250 cc/psi/cm$^2$/min.

Subsequent to $CO_2$ capture by the carbon adsorbent of the present disclosure, the adsorbent having $CO_2$ adsorbed thereon can be desorbed to release the $CO_2$ for subsequent sequestration or other disposition, in any suitable manner. For example, the $CO_2$-containing adsorbent may be desorbed of $CO_2$ by vacuum swing adsorption (VSA) processing, in which a vacuum is applied to the adsorbent to effect $CO_2$ desorption. Alternatively, desorption may be effected by pressure swing adsorption (PSA) processing, in which adsorption of $CO_2$ is carried out under higher pressure conditions, and desorption of $CO_2$ is carried out under lower pressure conditions. As a still further alternative, desorption may be carried out with heat input, to effect thermally-mediated desorption, such as by temperature swing adsorption (PSA) processing. It will be recognized that desorption may also be carried out with various combinations of the foregoing desorption modalities, or specific ones thereof, as well as in any other suitable manner.

Figure 1:
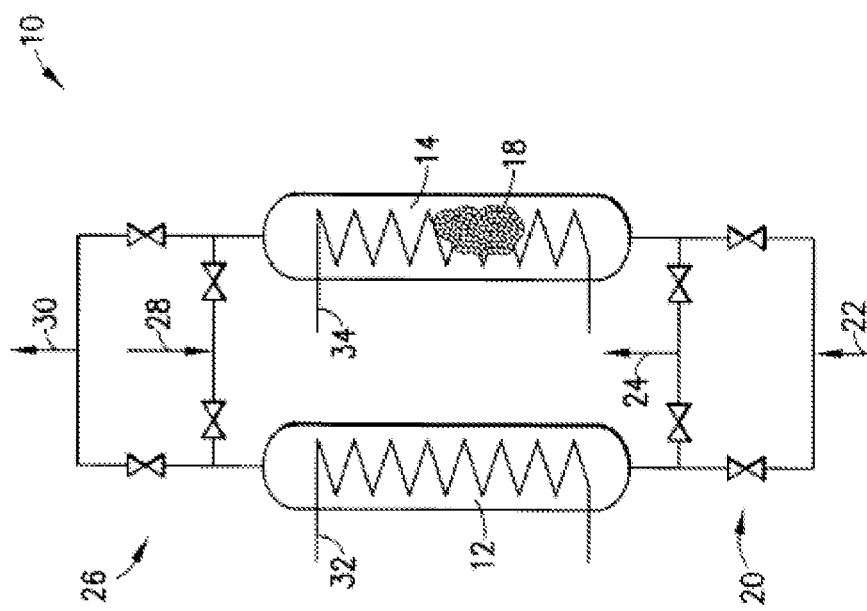
FIG. 1 is a schematic representation of a pressure swing adsorption/temperature swing adsorption system in which the adsorbent of the present disclosure may be employed for $CO_2$ capture in processing of $CO_2$-containing gas.

Referring now to the drawings, FIG. 1 is a schematic representation of a pressure swing adsorption/temperature swing adsorption system 10 in which the adsorbent of the present disclosure may be employed for $CO_2$ capture in processing of $CO_2$-containing gas.

The adsorption system 10 includes two adsorber vessels 12 and 14, each of which contains a bed of carbon pyrolyzate adsorbent 18 as shown in the partial break-away view of the vessel 14. The adsorber vessels 12 and 14 are manifolded to one another, by means of valved inlet manifold 20, including feed gas conduit 22, and purge gas discharge conduit 24 for releasing purge gas after countercurrent flow through the off-stream one of the adsorber vessels, while the other adsorber vessel is processing feed gas containing $CO_2$, to effect removal of $CO_2$ from such gas.

After passage through the on-stream one of the adsorber vessels, the $CO_2$-depleted gas flows into the valved discharge manifold 26, and is discharged from the system in effluent line 30. The valved discharge manifold 26 contains purge gas feed line 28, through which purge gas is introduced to the adsorber vessel system for countercurrent flow through the off-stream one of the respective adsorber vessels, and his discharge from system in purge gas discharge line 24.

By appropriate opening and closure of respective valves in the inlet and outlet manifolds, $CO_2$-containing gas is processed in the on-stream one of the respective adsorber vessels, while the other, during such on-stream operation of the first vessel, undergoes regeneration to remove $CO_2$ previously adsorbed on the carbon pyrolyzate adsorbent in the adsorber during active on-stream operation. In this manner, each of the respective adsorber vessels goes through cyclic alternating on-stream and off-stream operation, in respective segments of the process cycle.

The adsorber vessels 12 and 14 in the FIG. 1 embodiment are further equipped with heating elements 32 and 34, which can be of any suitable type. For example, such elements may be electrical resistive elements, which in use are coupled with a suitable source of electrical energy, so that current flow through such heating elements causes them to resistively heat to elevated temperature. Such heating elements then transfer heat to the adsorbent in the vessel undergoing regeneration, so that the adsorbent is heated to effect desorption of $CO_2$ from the carbon pyrolyzate adsorbent in the adsorber. The desorbed $CO_2$ then flows out of the bed being regenerated, and is discharged in the purge gas discharge line 24.

Alternatively, the heating elements 32 and 34 may be heat exchange fluid passages, through which a suitable heating fluid is passed, so that heat flows to the adsorbent in the corresponding vessel, to effect desorption of previously adsorbed $CO_2$. After such thermal swing operation, the flow of heating fluid through the adsorber is discontinued, and then a cooling fluid is passed through the adsorber, to reduce the temperature of the adsorbent therein below the temperature obtaining in the course of the heating step, so that the adsorbent thereby is renewed for subsequent continued processing of $CO_2$-containing gas.

FIG. 2 is a schematic representation of a moving bed $CO_2$ capture system 50 in which the adsorbent of the present disclosure can be employed for $CO_2$ capture in processing of $CO_2$-containing gas.

In this moving bed system, flue gas feed line 56 introduces particulate carbon pyrolyzate adsorbent into an upper end of the gravity-feed adsorber vessel 52. In the vessel, the carbon pyrolyzate adsorbent 54, shown in the breakaway view of FIG. 2, is contacted with $CO_2$-containing flue gas, introduced to the adsorber vessel 52 in line 62. As a result of this contact, the carbon dioxide in the flue gas is absorbed by the carbon pyrolyzate adsorbent 54.

Subsequently, as the $CO_2$-bearing adsorbent descends in the vessel under the force of gravity, such adsorbent is contacted with steam, introduced to the adsorber vessel 52 in line 64. The steam effects stripping of the $CO_2$ from the adsorbent as the adsorbent is heated by the steam and rises in temperature, to effect desorption of the $CO_2$ from the adsorbent. The desorbed $CO_2$ then is collected and discharged from the adsorber vessel 52 in line 66.

The $CO_2$-depleted adsorbent resulting from this steam stripping operation moves to the bottom of the adsorber vessel 52 and is discharged from such vessel in outlet line 58 into hopper 60.

It will be appreciated that the adsorber vessel of FIG. 2 can be varied substantially in aspect ratio of vessel height to vessel diameter, manner and position of the various conduits coupled in gas flow communication with the adsorber vessel, the size and characteristics of the adsorbent, the fluid characteristics of the gas streams introduced to the vessel, and temperature, pressure, flow rate and composition of the respective streams, etc.

It will be correspondingly appreciated that the vessels used and process arrangements of the $CO_2$ capture apparatus as shown in FIGS. 1 and 2 are of an illustrative character only, and that the specific components, system and processing approaches utilized in $CO_2$ capture apparatus may be quite differently constructed and arranged for operation.

The $CO_2$-selective carbon pyrolyzate adsorbent of the present disclosure has demonstrated a $CO_2$ capture efficiency of 98% and corresponding capability of producing product $CO_2$ gas at purity greater than 97%. In general, such adsorbent enables capture of at least 90% of the $CO_2$ from the flue gas of a pulverized coal fired power plant utilized to generate electricity.

The present disclosure thus contemplates carbon adsorbents useful for adsorption of $CO_2$, e.g., to remove $CO_2$ from gas mixtures containing same, and from which adsorbed $CO_2$ is desorbable by any one or more of temperature, pressure, vacuum, and concentration gradient desorption modalities, wherein the carbon adsorbent is characterized by any one or multiple ones of the following characteristics, wherein when multiple ones of such characteristics are applicable, such multiple characteristics are mutually compatible with one another:

(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and (d) a $CO_2/N_2$ Henry's Law Separation Factor greater than 5;
(e) being a pyrolyzate of homopolymer PVDC, PVDC-MA copolymer, PVDC-polyvinyl chloride (PVDC-PVC) copolymers, polyfurfuryl alcohol, polyacrylonitrile, and polymers containing heteroatoms that upon carbonization are left as dispersed species throughout the carbon material;
(f) an average particle diameter greater than 50 µm;
(g) particle diameter in a range of from 10 to 500 µm;
(h) particle diameter in a range of 150 to 500 µm;
(i) median particle diameter in a range of from 200 to 350 µm;
(j) bulk density greater than 0.55 g/mL;
(k) $CO_2$ heats of adsorption and desorption each of which is in a range of from 20 to 30 kJ/mole;
(l) water adsorptive capacity of less than 5% by weight, based on weight of the adsorbent, at 303° Kelvin and 40% relative humidity;
(m) average pore size below 1 nm;
(n) porosity at least 50% of the pore volume of which is constituted by pores in a pore size range of from 0.35 to 0.7 nm;
(o) porosity characterized by a median pore width below 1 nm;
(p) an attrition rate index less than 1 wt %/hr as measured by the procedure of ASTM D 5757;
(q) $N_2$ BET surface area of at least 800 m² per gram;
(r) $N_2$ BET surface area of at least 900 m² per gram;
(s) $N_2$ BET surface area of at least 1000 m² per gram;
(t) $N_2$ micropore volume of at least 0.2 mL per gram;
(u) $N_2$ micropore volume in a range of from 0.3 to 0.6 mL per gram;
(v) $CO_2$ capture recovery of at least 90% and $CO_2$ capture purity of at least 90%, when contacted with a simulated flue gas composition comprising air containing 15% $CO_2$ and saturated with water vapor, at 383° Kelvin and volumetric flow rate of 100 L/minute of simulated flue gas composition per liter of a bed of the adsorbent;
(w) being a pyrolyzate of homopolymer PVDC, PVDC-MA copolymer having a weight average molecular weight in a range of from 80,000 to 100,000;
(x) bulk density greater than 0.55 grams per cubic centimeter;
(y) bulk density greater than 0.9 grams per cubic centimeter;
(z) bulk density in a range of from about 1.0 to about 2.2 grams per cubic centimeter;
(aa) being in a form of granules;
(ab) being in a bead form;
(ac) being in a form of a monolith;
(ad) being in a cylindrical form;
(ae) being in a disc form;
(af) being of porous, non-graphitized carbon;
(ag) $N_2$ BET surface area being in a range of from tw m² per gram;
(ah) having porosity, substantially all of which is in pores <2 nm in diameter;
(ai) $CO_2$ capacity greater than 120 volumes of $CO_2$/volume of carbon pyrolyzate adsorbent as measured at 273° Kelvin and 1 atmosphere pressure;
(aj) $CO_2$ capacity greater than 130 volumes of $CO_2$/volume of carbon pyrolyzate adsorbent as measured at 273° Kelvin and 1 atmosphere pressure;
(ak) $CO_2$ capacity of at least 20 wt % at 1 atm $CO_2$, based on weight of the adsorbent;
(al) $CO_2$ adsorption activation energy less than 5 kJ/mole;
(am) $CO_2$ heats of adsorption and desorption each of which is in a range of from 25 to 28 kJ/mole;
(an) $CO_2$ being desorbable from the adsorbent with steam;
(ao) adsorbent lifetime of at least 50,000 adsorption/desorption cycles for adsorption and desorption of $CO_2$;
(ap) being in a form of spherical adsorbent granules;
(aq) being in a form of spherical adsorbent granules 100 to 300 µm in diameter;
(ar) non-agglomerable or sinterable at 100° C.;
(as) being of hydrophobic character;
(at) $CO_2$ capacity of at least 100 volumes of $CO_2$/volume of carbon material, as measured at 273° Kelvin and 1 atmosphere pressure;
(au) being >40% by volume micropores;
(av) having at least 50% of pore volume in pores <0.7 nm;
(aw) a separation factor greater than 6 for $CO_2$ over $N_2$;
(ax) a separation factor in a range of from 6.2 to 7.5 for $CO_2$ over $N_2$;
(ay) a permeability for $CO_2$ greater than 900 cc/psi/cm²/min;
(az) a permeability for $CO_2$ in a range of from 910 to 1250 cc/psi/cm²/min; and
(ca) an attrition rate index <0.01 wt % per hour in a downflow reactor.

The disclosure thus contemplates all possible permutations of the above parameters (a)-(ca).

In various embodiments, the carbon adsorbent of the present disclosure is characterized by:
(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole;
(d) a $CO_2/N_2$ Henry's Law Separation Factor greater than 5; and any one or more of the parameters (e)-(ca) described above.

The features and advantages of the carbon pyrolyzate adsorbent of the present disclosure are more fully shown by the following non-limiting Example.

EXAMPLE 1

A $CO_2$ capture process was carried out, using a circulating, falling stream of granules of carbon pyrolyzate adsorbent to separate an incoming stream of flue gas. The carbon pyrolyzate adsorbent utilized in this example had the following characteristics: a $CO_2$ adsorption capacity measured at 1 atm pressure of $CO_2$ of 20 percent by weight, based on weight of the adsorbent; an activation energy of <5 kJ/mole for micropore adsorption of $CO_2$ by the adsorbent; heat of adsorption and heat of desorption each being in a range of 25 to 28 kJ/mole; high hydrothermal stability; mechanical stability over at least 50,000 adsorption/desorption cycles; spherical granule form of the carbon pyrolyzate adsorbent, with granule diameter being in a range of from 100 to 300 µm; agglomeration resistance at temperature of 100° C.; heat capacity of 1 J/g/K; thermal conductivity of 0.8 w/m-K; and hydrophobicity of the carbon pyrolyzate material.

The flue gas in the $CO_2$ capture process was separated into a $CO_2$-lean flue gas stream in which over 90% of the $CO_2$ was removed, and a pure stream of $CO_2$ for disposition such as compression and sequestration.

Figure 3:
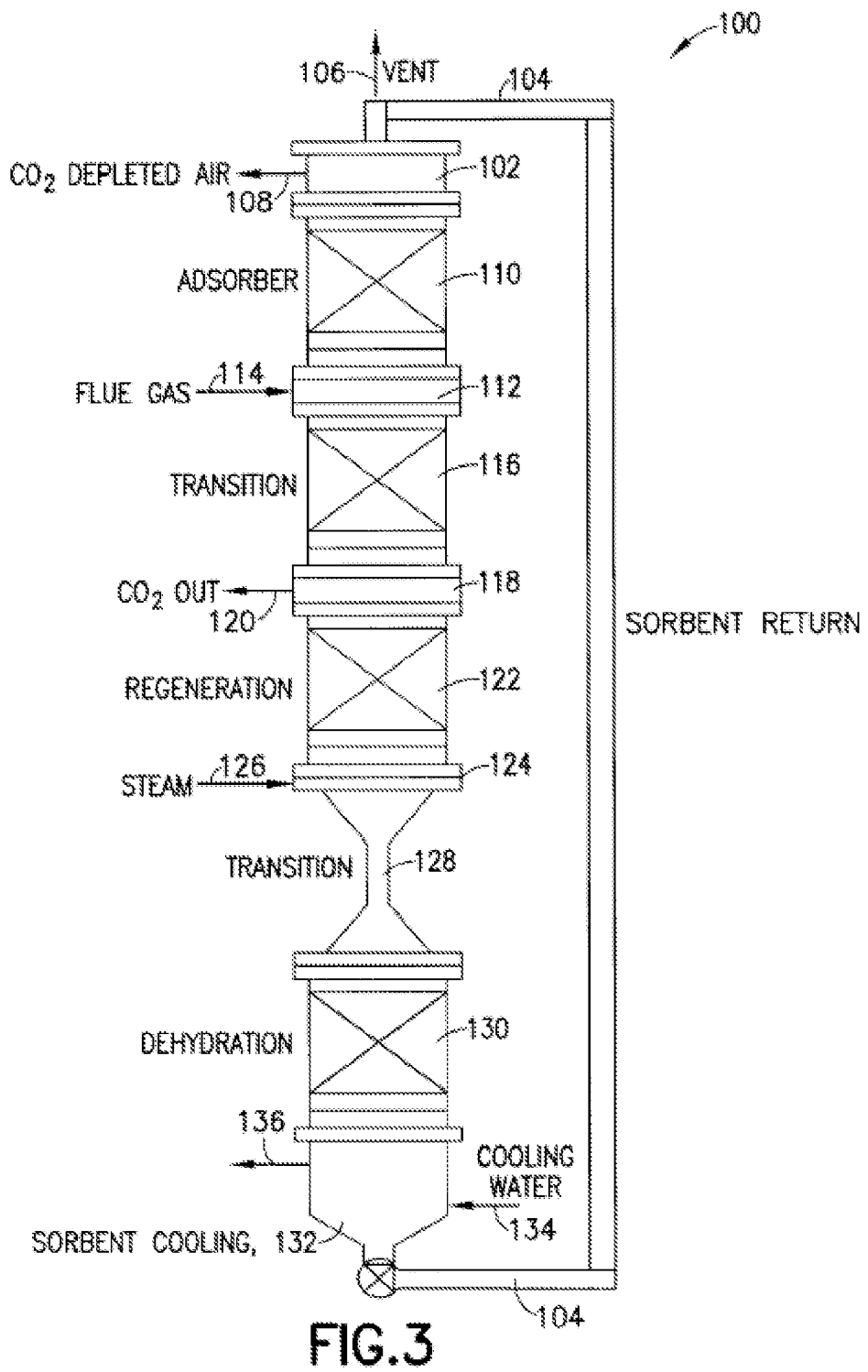
FIG. 3 is a schematic representation of an integrated adsorption-stripper reactor in which carbon adsorbent of the present disclosure can be utilized to effect $CO_2$ removal from a $CO_2$-containing gas mixture.

The $CO_2$ capture process utilized an integrated adsorption-stripper reactor having a configuration as schematically shown in FIG. 3.

As illustrated in FIG. 3, the adsorption-stripper reactor 100 has a vertically elongate conformation, with an upper portion 102 of the reactor receiving recirculated carbon pyrolyzate adsorbent from sorbent return line 104. The upper portion 102 of the reactor has a vent schematically represented by arrow 106, and a $CO_2$-depleted air discharge line 108.

The introduced carbon pyrolyzate adsorbent passes downwardly through the reactor column from the upper portion 102 through adsorber section 110. Flue gas is introduced in inlet 114 to the flue gas introduction section 112, for flow upwardly through the adsorber section 110 in which the flue gas is contacted with the carbon pyrolyzate adsorbent to yield the $CO_2$-depleted air discharged in discharge line 108.

Reactor 100 further includes a transition section 116, and a $CO_2$ discharge section 118 from which $CO_2$ desorbed from the adsorbent is discharged in outlet line 120. The $CO_2$ desorbate is released from the carbon pyrolyzate adsorbent in regeneration section 122, which is fed with steam introduced in line 126 to the steam inlet section 124.

Below the steam inlet section 124 is a transition section 128 including an upper, downwardly converging funnel section, a central cylindrical section, and a lower, downwardly diverging funnel section. Below the transition section 128 is a dehydration section 130, in which the carbon pyrolyzate adsorbent is dehydrated. The dehydration section 130 communicates with lower cooling portion 132. The lower cooling portion 132 is cooled by cooling water introduced in inlet line 134 and discharged in line 136. The carbon pyrolyzate adsorbent thus is dehydrated and cooled in sections 130 and 132, and passes to the sorbent return line 104, for recycle to the upper portion of the reactor.

By such reactor design, a simple, efficient separation of $CO_2$ is achieved in a continuous process, with capture of $CO_2$ from the flue gas being performed at near-ambient temperature, as the granules of carbon pyrolyzate adsorbent flow downwardly through the reactor by gravitational countercurrent flow to the up flowing flue gas in the adsorber section 110 of the reactor. The adsorbed $CO_2$ is stripped by heating the $CO_2$-loaded adsorbent to ~100 degrees Centigrade, in contact with low pressure (<5 psig) steam in the lower portion of the reactor, to yield a recovered $CO_2$ stream that is of high purity. By down-flow of the adsorbent granules from the top to the bottom of the reactor, readily available structural packing materials may be employed in the reactor. The low pressure steam used for stripping $CO_2$ from the adsorbent is readily available in a coal-fired power plant.

In the operation of the reactor illustrated in FIG. 3, flue gas containing approximately 15% $CO_2$ is fed to the base of the adsorber section 110 and is discharged, stripped of $CO_2$, at the top of the adsorber, in $CO_2$-depleted air discharge line 108. As the carbon pyrolyzate adsorbent moves downwardly through the adsorber section 110, it adsorbs the counter-flowing $CO_2$ and a small fraction of nitrogen, oxygen and other light components of the flue gas.

As the adsorbent moves down through the transition section 116, it encounters increasing partial pressure of $CO_2$ and decreasing partial pressure of light gases. This causes the adsorbent to adsorb more $CO_2$ and to desorb the nitrogen and oxygen, so that at the base of the transition section, the adsorbent is saturated with pure $CO_2$.

Steam is introduced into the stripper at ~1 bar pressure. The steam is adsorbed, causing the adsorbent temperature rise, resulting in the desorption of $CO_2$. The steam also acts to reduce the partial pressure of $CO_2$, enhancing additional removal of $CO_2$ and the resulting desorbed $CO_2$ flows up and out of the stripper, where it is extracted as a product stream of essentially pure $CO_2$.

Figure 4:
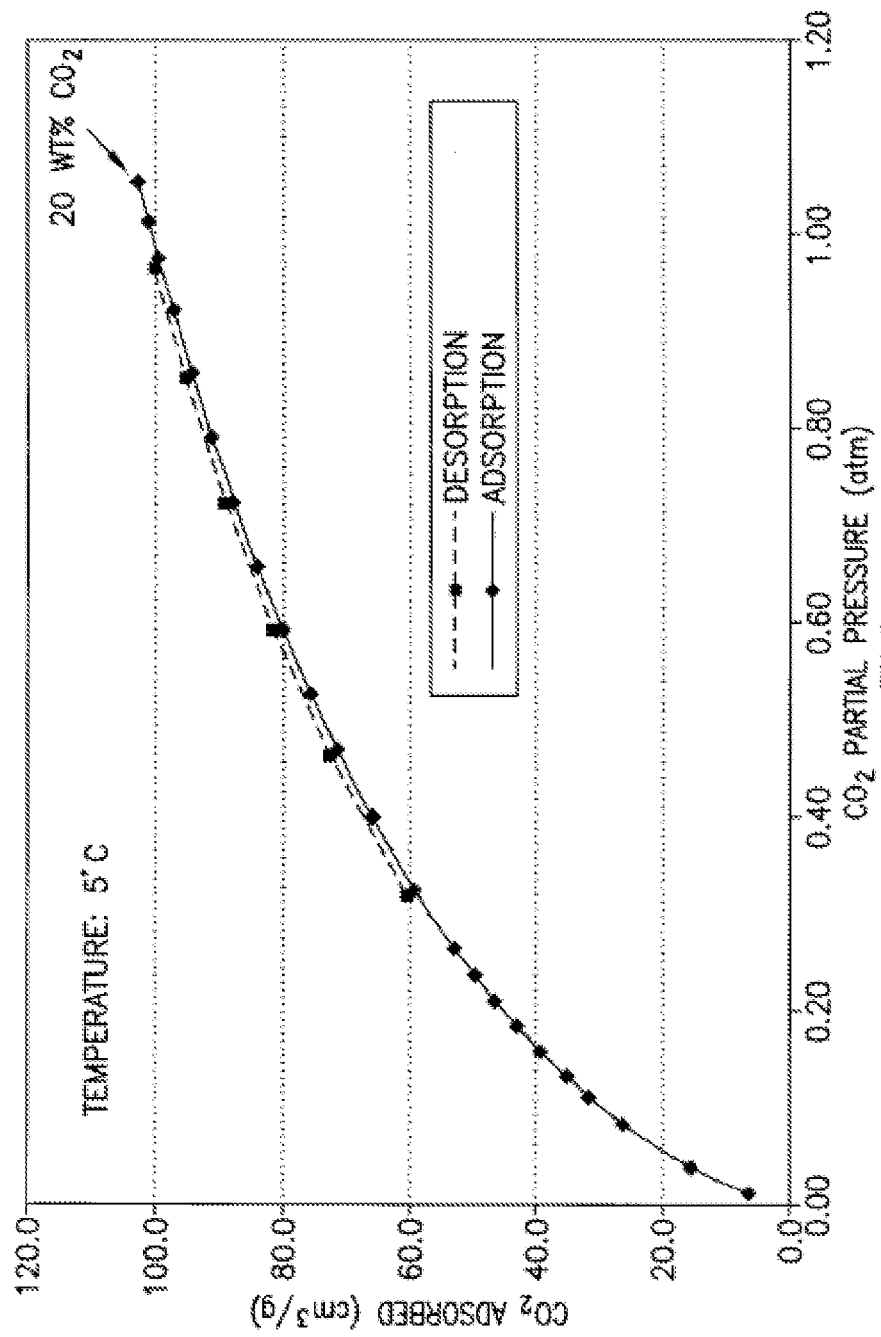
FIG. 4 is a graph of $CO_2$ adsorbed, in cubic centimeters per gram, as a function of $CO_2$ partial pressure, in atmospheres, for a carbon adsorbent of the present disclosure.

Flue gas processing was carried out as described above in a reactor of a type as schematically shown in FIG. 3. The adsorption capacity of the carbon pyrolyzate adsorbent for $CO_2$ was measured using a volumetric method in a Micromeritics ASAP 2020 system under isothermal conditions as a function of pressure. The adsorption isotherm measured at 5° C. is shown in FIG. 4. The adsorption was reversible as indicated by the absence of hysteresis between adsorption and desorption isotherms. The high quantity of adsorbed $CO_2$ (100 cc/g) indicated that the adsorbent had a high capacity that approached 20 wt % at 5° C.

The high $CO_2$ capacity was attributable to a relatively high surface area of the adsorbent. The surface area of the carbon pyrolyzate adsorbent was determined from a $CO_2$ adsorption isotherm at 20° C. From a Dubinin-Polanyi plot of $CO_2$ adsorption isotherm, the surface area of the adsorbent was determined to be 1320 m²/g. Based on this measured surface area, it was concluded that much less than a monolayer coverage of $CO_2$ was present on the adsorbent surface even at 20 wt % loading of $CO_2$ on the adsorbent.

The effect of moisture on the $CO_2$ adsorption was relatively minor. Fixed-bed adsorber experiments were conducted at 25° C. with air-15% $CO_2$ containing various levels of relative humidity. The $CO_2$ capacity was decreased less than 20% by high levels of moisture in the flue gas (e.g., 80% relative humidity).

Figure 5:
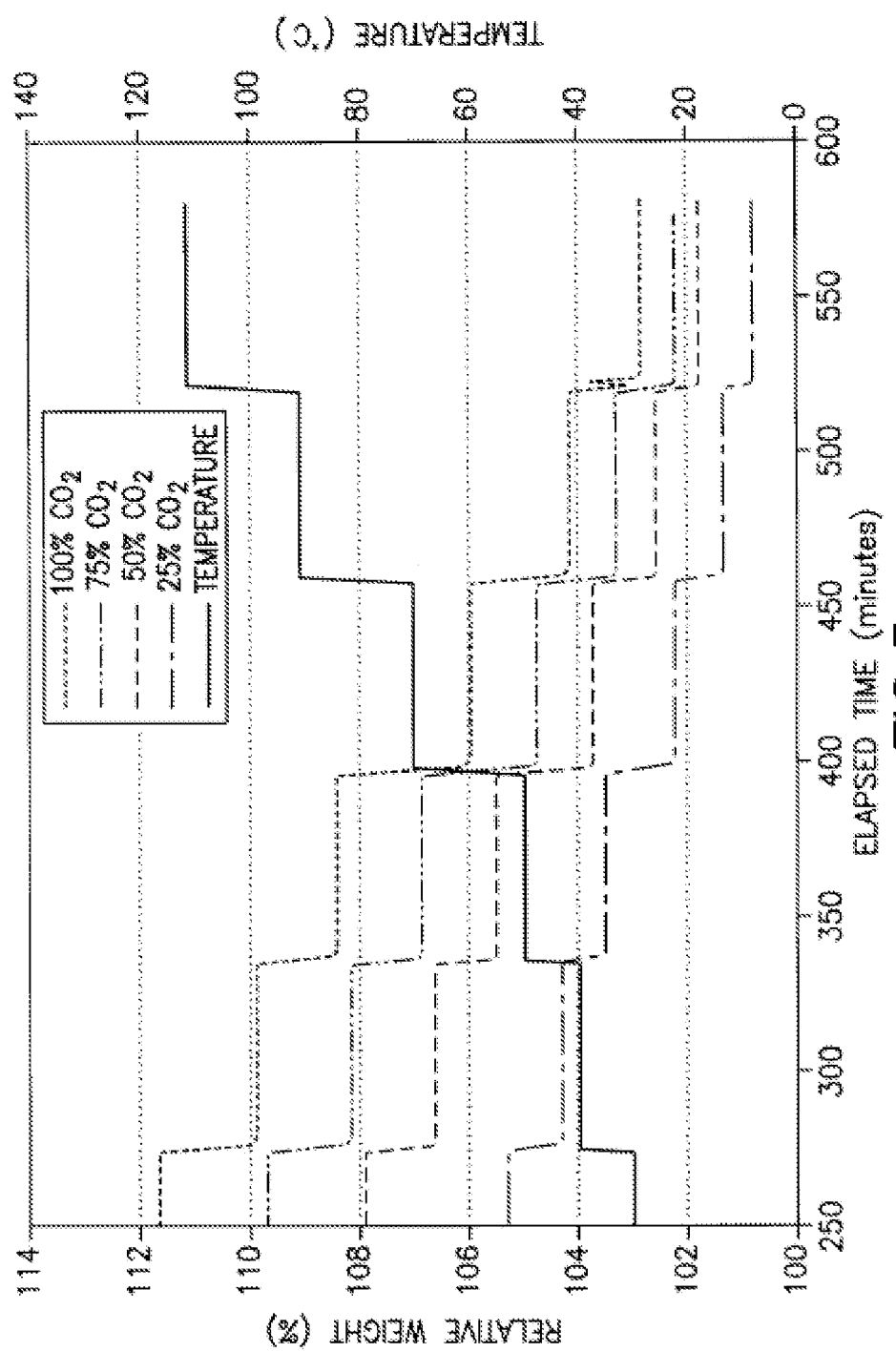
FIG. 5 shows the thermal desorption of $CO_2$ as a function of temperature for a series of $CO_2$—Ar gas mixtures.

$CO_2$ desorbed rapidly from the adsorbent as it was heated, with the rate of desorption mainly determined by temperature raise and the partial pressure of $CO_2$ in the gas. The desorption of $CO_2$ was characterized by thermogravimetric analysis (TGA), with the adsorbent first equilibrated under each $CO_2$ partial pressure at 30° C., following which the temperature was increased stepwise in a gas stream containing indicated levels of $CO_2$ in argon. The mass change due to desorption of $CO_2$ was measured as a function of temperature and the partial pressure of $CO_2$. FIG. 5 shows the thermal desorption of $CO_2$ as a function of temperature for a series of $CO_2$—Ar gas mixtures. The change in mass was due to the $CO_2$ desorption from the adsorbent. The mass change was very rapid after each temperature rise and quickly reached a steady state, indicating a rapid desorption of $CO_2$ from the sorbent. Although the extent of desorption was facilitated by low partial pressure of $CO_2$, $CO_2$ was able to be desorbed even in pure $CO_2$ at 100° C.

High mechanical strength and attrition resistance are important attributes in any $CO_2$ capture process using solid adsorbents. The compression strength of the adsorbent granules utilized in the $CO_2$ capture process was 18,000 psi, a very high value for a highly porous sorbent. Under the conditions experienced in the falling granule reactor, these high strength carbon sorbent granules were highly resistant to disintegration.

The attrition resistance of the carbon pyrolyzate adsorbent granules was measured by the ASTM D5757 air jet test procedure, which has been designed for fluidized bed reactor catalysts. The attrition rate index, defined as the rate of weight loss between 1 hr and 5 hr of testing was only <0.01 wt % per hour. This low value indicates that the carbon pyrolyzate adsorbent was very tough and significantly more attrition-resistant than FCC catalysts, which typically exhibit an attrition index of 4% per hour. In the ASTM test, a batch of 50 gm of carbon pyrolyzate adsorbent granules was placed inside a conical vessel on top of a disc with three 0.038-cm-diameter holes through which air was passed as a high-velocity air jet (~500 m/sec). The carbon pyrolyzate adsorbent granules in this test were accelerated by the jet and impacted each other and the walls. Any solid powder that separated from the granules due to attrition was carried away by the flowing air, and the entrained powder was collected in a filter to calculate the attrition rate index. In the falling granule reactor, the attrition of carbon pyrolyzate adsorbent thus is extremely low.

The high attrition resistance of the carbon pyrolyzate adsorbent granules was also demonstrated in a 50-hr test in a 6-in.-diameter integrated adsorber-stripper system. Fine particles in the $CO_2$-lean adsorber exhaust air were collected in a fine particle filter. The mass of fines was 0.2% of the mass of adsorbent; a fraction of those fines was likely to be fines that were present in the feed and were elutriated. If all collected fines were assumed to have been created by attrition, then the operating life of the adsorber-stripper system would be more than 3 years. Microscopic examination of the fines, however, showed that more than 95% were intact spherical granules, as manufactured. No rough surfaces indicative of fracture were readily apparent. It therefore was concluded that the adsorbent operating life in such adsorber-stripper system is not limited by attrition effects.

Figure 6:
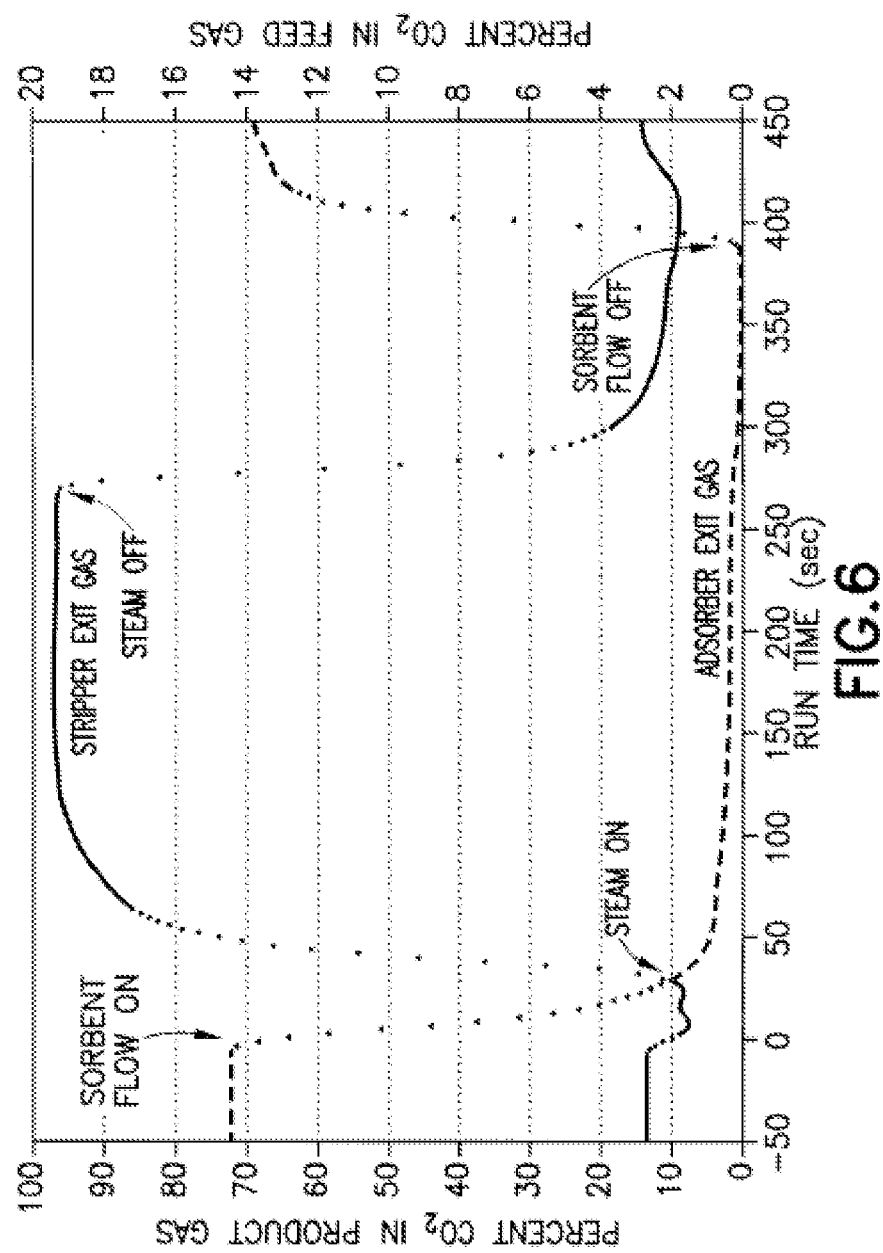
FIG. 6 is a graph of concentration of $CO_2$ in adsorber and stripper exit gas streams, in operation of an integrated adsorption-stripper reactor of a type as shown in FIG. 3.

FIG. 6 illustrates a composition of the gas leaving the adsorber and the stripper in a typical run in a 2-inch (inner diameter) reactor having a general configuration as shown in FIG. 3. The reactor was operated with 15% $CO_2$ mixed with ambient air at 1 atm pressure. After the introduction of the adsorbent, the $CO_2$ concentration in the adsorber exit gas decreased rapidly from 14.5% to 0.3%. This decrease, after accounting for the change in the volumetric flow of the gas, corresponded to 98% $CO_2$ capture from the feed gas. The corresponding composition trace of the $CO_2$ rich stream from the stripper is also shown in FIG. 6. On the introduction of steam into the stripper, $CO_2$ was desorbed from the sorbent. The $CO_2$ concentration in the stripper exit gas increased and attained a >90% value after about 1 minute. Under steady state conditions, the $CO_2$ purity achieved in this run was 97%.

Long-term studies were conducted in a 6-in (inner diameter) integrated reactor of the type shown in FIG. 3. The integrated reactor system was operated using ambient air containing 15% $CO_2$. This up-flowing gas stream contacted the carbon pyrolyzate adsorbent granules flowing down the adsorber column and $CO_2$ was adsorbed on the carbon pyrolyzate adsorbent. The adsorbent continued to flow down, by gravity, to the stripper section (with a transition section between the adsorber and stripper sections) in which the adsorbent was heated by steam flowing directly into the stripper to ~110° C. $CO_2$ was desorbed from the adsorbent and flowed out of the stripper. The adsorbent flowed down from the stripper to the dehydrator in which the adsorbed water was removed by a stream of up-flowing air. This dehydration step cools the adsorbent from 110° C. to 60° C. In commercial practice, the evolved moisture can be condensed to recover the water. Further adsorbent cooling was accomplished at the bottom of the column in a heat exchanger through which cold water was passed through a coil. The sorbent granules, cooled to 30° C., were withdrawn using a screw feeder and lifted pneumatically to the top of the adsorber for further $CO_2$ adsorption. Thus, the adsorbent flowed downwardly by gravity in this system, except for the return of the adsorbent to the top of the adsorber. Such arrangement minimizes energy consumption and reduces or eliminates attrition of the sorbent granules.

Figure 7:
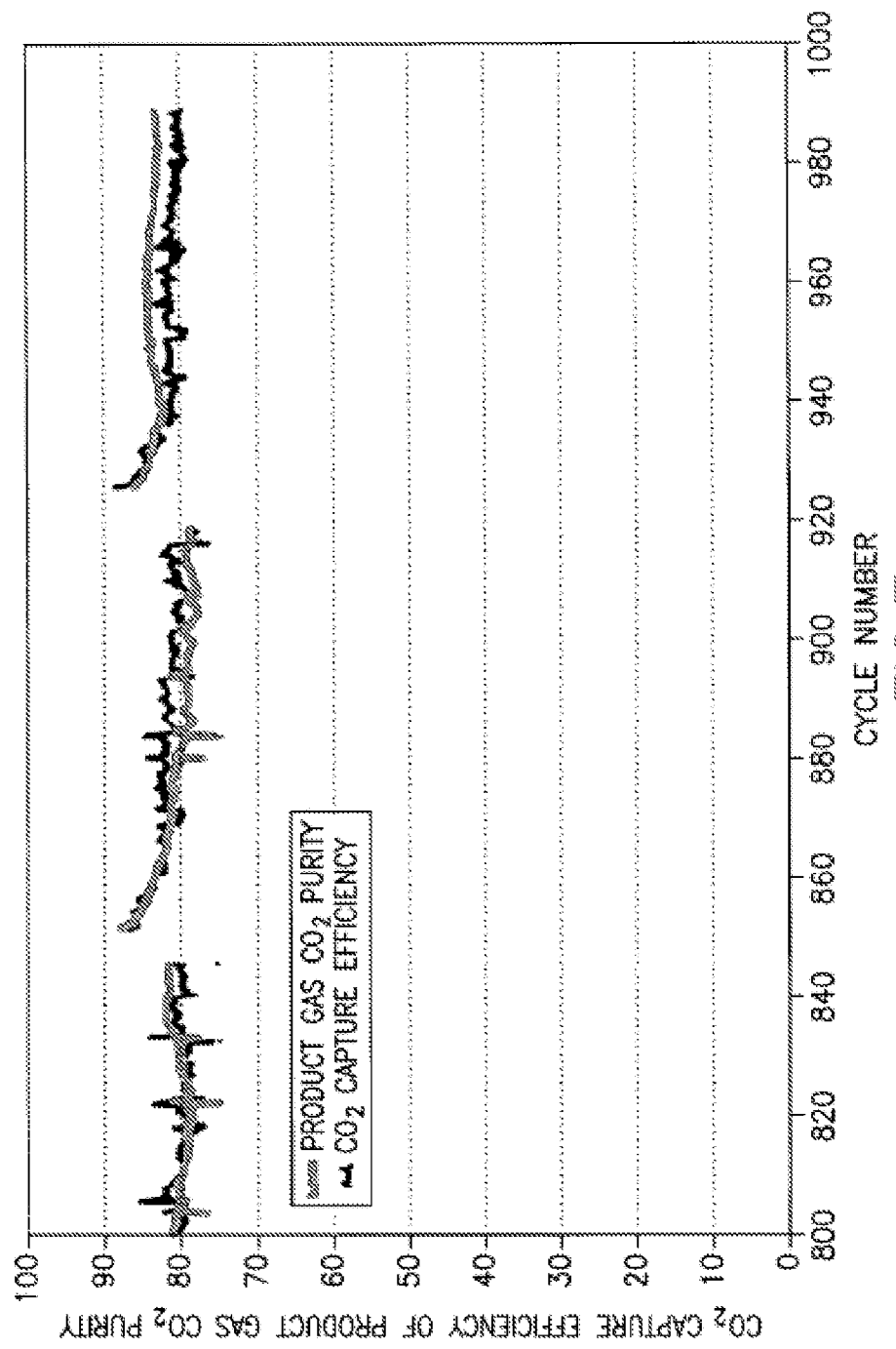
FIG. 7 is a graph of $CO_2$ capture efficiency and $CO_2$ purity of $CO_2$ product gas through a 1000-cycle test, in an integrated adsorption-stripper reactor of a type as shown in FIG. 3.
Figure 8:
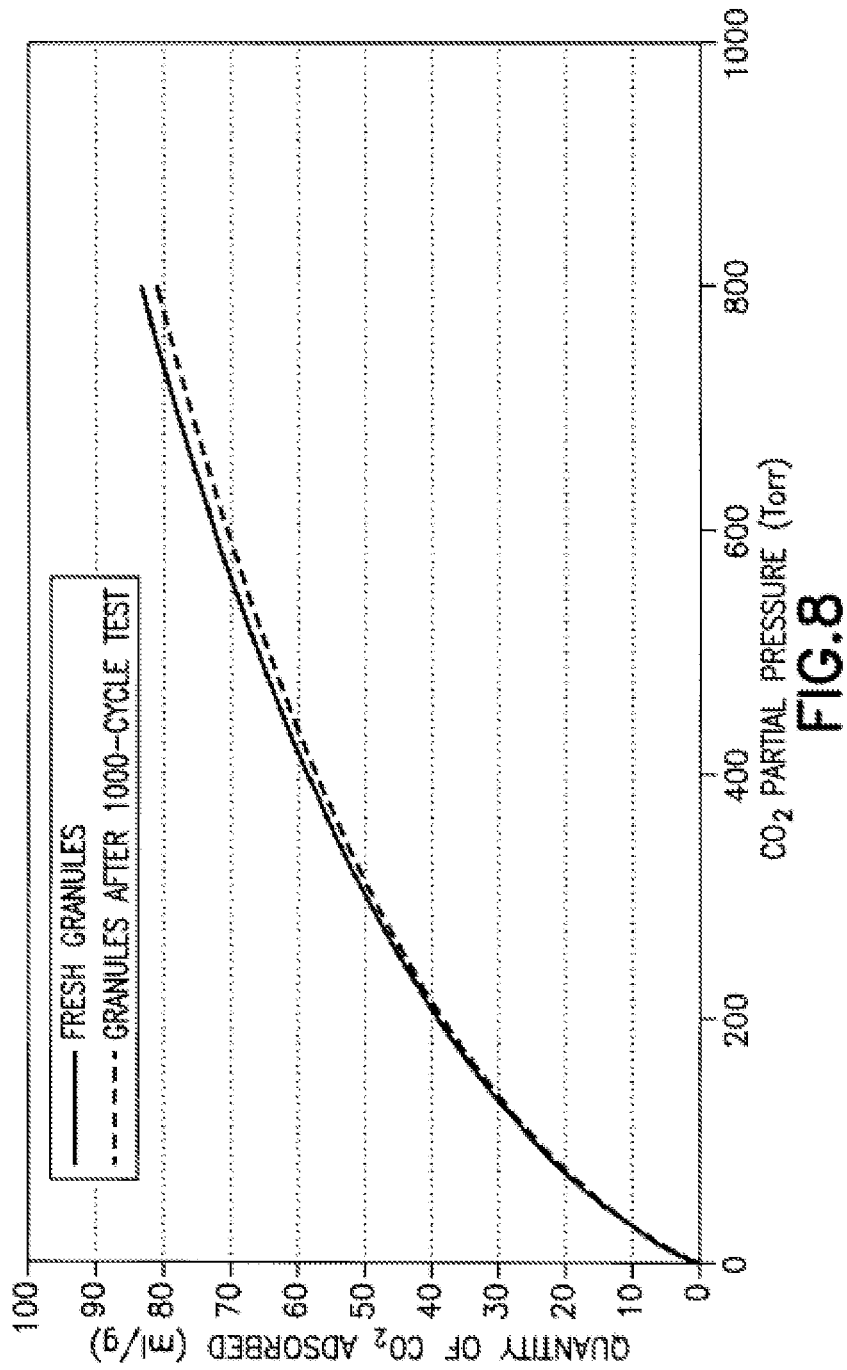
FIG. 8 is a graph of amount of $CO_2$ adsorbed, in milliliters of $CO_2$ per gram of carbon adsorbent, as a function of $CO_2$ partial pressure, in torr, for carbon adsorbent of the present disclosure prior to any contact with $CO_2$-containing gas, and after 1000 cycles of adsorption/desorption of $CO_2$.

The system was capable of operation without any significant difficulty through a 1000-cycle test, as shown by the data in FIG. 7. The performance of the reactor remained stable over the period of operation. After minor modification of the integrated reactor system to improve cooling of the adsorbent, the capture efficiency and $CO_2$ product gas purity were 95 and 98%, respectively. The start-up of the system and shut-down of the system were accomplished smoothly. The $CO_2$ absorption isotherms of the sorbent granules were measured for the fresh carbon pyrolyzate adsorbent granules as well as for the carbon pyrolyzate adsorbent granules after the 1000-cycle test. The respective adsorption isotherms, shown in FIG. 8, were nearly identical, indicating that the carbon pyrolyzate adsorbent did not degrade during the long-term test.

Accordingly, while the disclosure has been has been set out herein in reference to specific aspects, features and illustrative embodiments, it will be appreciated that the utility of such aspects, features and embodiments is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A carbon pyrolyzate adsorbent, comprising a pyrolyzate of a PVDC copolymer, wherein the PVDC copolymer comprises a copolymer of an acrylic acid ester, said adsorbent having the following characteristics:
   (a) $CO_2$ capacity greater than 105 cc/gram at one bar pressure and temperature of 273° Kelvin;
   (b) $CO_2$ Working Capacity greater than 7.0 weight percent;
   (c) $CO_2$ heats of adsorption and desorption each of which is in a range of from 10 to 50 kJ/mole; and
   (d) a $CO_2/N_2$ Henry's Law Separation Factor greater than 5.

2. The adsorbent of claim 1, wherein the acrylic acid ester comprises methyl acrylate.

3. The adsorbent of claim 1, comprising particles of diameter in a range of from 10 to 500 μm.

4. The adsorbent of claim 1, comprising particles having a median particle diameter in a range of from 200 to 350 μm.

5. The adsorbent of claim 1, having a water sorptive capacity of less than 5% by weight, based on weight of the adsorbent, at 303° Kelvin and 40% relative humidity.

6. The adsorbent of claim 1, having porosity at least 50% of the pore volume of which is constituted by pores in a pore size range of from 0.35 to 0.7 nm.

7. The adsorbent of claim 1, having porosity characterized by a median pore width below 1 nm.

8. The adsorbent of claim 1, having a nitrogen BET surface area of at least 800 m$^2$ per gram.

9. The adsorbent of claim 1, having a nitrogen micropore volume of at least 0.2 mL per gram.

10. The adsorbent of claim 1, characterized by $CO_2$ capture recovery of at least 90% and $CO_2$ capture purity of at least 90%, when contacted with a simulated flue gas composition comprising air containing 15% $CO_2$ and saturated with water vapor, at 383° Kelvin and volumetric flow rate of 100 L/minute of simulated flue gas composition per liter of bed of the adsorbent.

11. The adsorbent of claim 1, wherein the adsorbent has at least one additional compatible characteristic selected from the group consisting of:
   (e) being a pyrolyzate of homopolymer PVDC, PVDC-MA copolymer, PVDC-polyvinyl chloride (PVDC-PVC) copolymers, polyfurfuryl alcohol, polyacrylonitrile, and polymers containing heteroatoms that upon carbonization are left as dispersed species throughout the carbon material;
   (f) an average particle diameter greater than 50 μm;
   (g) particle diameter in a range of from 10 to 500 μm;
   (h) particle diameter in a range of 150 to 500 μm;
   (i) median particle diameter in a range of from 200 to 350 μm;
   (j) bulk density greater than 0.55 g/mL;
   (k) $CO_2$ heats of adsorption and desorption each of which is in a range of from 20 to 30 kJ/mole;

(l) water adsorptive capacity of less than 5% by weight, based on weight of the adsorbent, at 303° Kelvin and 40% relative humidity;
(m) average pore size below 1 nm;
(n) porosity at least 50% of the pore volume of which is constituted by pores in a pore size range of from 0.35 to 0.7 nm;
(o) porosity characterized by a median pore width below 1 nm;
(p) an attrition rate index less than 1 wt %/hr as measured by the procedure of ASTM D 5757;
(q) $N_2$ BET surface area of at least 800 $m^2$ per gram;
(r) $N_2$ BET surface area of at least 900 $m^2$ per gram;
(s) $N_2$ BET surface area of at least 1000 $m^2$ per gram;
(t) $N_2$ micropore volume of at least 0.2 mL per gram;
(u) $N_2$ micropore volume in a range of from 0.3 to 0.6 mL per gram;
(v) $CO_2$ capture recovery of at least 90% and $CO_2$ capture purity of at least 90%, when contacted with a simulated flue gas composition comprising air containing 15% $CO_2$ and saturated with water vapor, at 383° Kelvin and volumetric flow rate of 100 L/minute of simulated flue gas composition per liter of a bed of the adsorbent;
(w) being a pyrolyzate of homopolymer PVDC, PVDC-MA copolymer having a weight average molecular weight in a range of from 80,000 to 100,000;
(x) bulk density greater than 0.55 grams per cubic centimeter;
(y) bulk density greater than 0.9 grams per cubic centimeter;
(z) bulk density in a range of from about 1.0 to about 2.2 grams per cubic centimeter;
(aa) being in a form of granules;
(ab) being in a bead form;
(ac) being in a form of a monolith;
(ad) being in a cylindrical form;
(ae) being in a disc form;
(af) being of porous, non-graphitized carbon;
(ag) $N_2$ BET surface area being in a range of from tw $m^2$ per gram;
(ah) having porosity, substantially all of which is in pores <2 nm in diameter;
(ai) $CO_2$ capacity greater than 120 volumes of $CO_2$/volume of carbon pyrolyzate adsorbent as measured at 273° Kelvin and 1 atmosphere pressure;
(aj) $CO_2$ capacity greater than 130 volumes of $CO_2$/volume of carbon pyrolyzate adsorbent as measured at 273° Kelvin and 1 atmosphere pressure;
(ak) $CO_2$ capacity of at least 20 wt % at 1 atm $CO_2$, based on weight of the adsorbent;
(al) $CO_2$ adsorption activation energy less than 5 kJ/mole;
(am) $CO_2$ heats of adsorption and desorption each of which is in a range of from 25 to 28 kJ/mole;
(an) $CO_2$ being desorbable from the adsorbent with steam;
(ao) adsorbent lifetime of at least 50,000 adsorption/desorption cycles for adsorption and desorption of $CO_2$;
(ap) being in a form of spherical adsorbent granules;
(aq) being in a form of spherical adsorbent granules 100 to 300 μm in diameter;
(ar) non-agglomerable or sinterable at 100° C.;
(as) being of hydrophobic character;
(at) $CO_2$ capacity of at least 100 volumes of $CO_2$/volume of carbon material, as measured at 273° Kelvin and 1 atmosphere pressure;
(au) being >40% by volume micropores;
(av) having at least 50% of pore volume in pores <0.7 nm;
(aw) a separation factor greater than 6 for $CO_2$ over $N_2$;
(ax) a separation factor in a range of from 6.2 to 7.5 for $CO_2$ over $N_2$;
(ay) a permeability for $CO_2$ greater than 900 $cc/psi/cm^2/min$;
(az) a permeability for $CO_2$ in a range of from 910 to 1250 $cc/psi/cm^2/min$; and
(ba) an attrition rate index <0.01 wt % per hour in a downflow reactor.

12. A method of making an adsorbent for carbon capture, said method comprising pyrolyzing a PVDC copolymer, wherein the PVDC copolymer comprises a copolymer of an acrylic acid ester, under conditions that are effective to yield a carbon pyrolyzate material having the following characteristics:
(a) $CO_2$ capacity greater than 105 cc/gram at one bar pressure and temperature of 273° Kelvin;
(b) $CO_2$ Working Capacity greater than 7.0 weight percent;
(c) $CO_2$ heats of adsorption and desorption each of which is in a range of from 10 to 50 kJ/mole; and
(d) a $CO_2/N_2$ Henry's Law Separation Factor greater than 5.

13. The method of claim 12, wherein the acrylic acid ester comprises methyl acrylate.

14. The method of claim 12, wherein the PVDC copolymer comprises a PVDC-MA copolymer having a weight average molecular weight in a range of from 80,000 to 100,000.

15. The method of claim 12, wherein said pyrolyzing is conducted at temperature in a range of from 600° C. 2 900° C. under inert atmosphere.

16. The method of claim 15, followed by exposing the carbon pyrolyzate material to an oxidizing atmosphere at temperature above 250° C.

17. A CO2 capture apparatus, comprising the carbon pyrolyzate adsorbent of claim 1 in a reactor configured for contacting of the carbon pyrolyzate adsorbent with CO2-containing gas.

18. The CO2 capture apparatus of claim 17, configured for regeneration of the carbon pyrolyzate adsorbent after it has been loaded to a predetermined extent with CO2 in said contacting.

19. The CO2 capture apparatus of claim 17, comprising a moving bed contacting system for said contacting of the carbon pyrolyzate adsorbent with CO2-containing gas.

20. A method of capturing CO2 from CO2-containing gas, said method comprising contacting the CO2-containing gas with a carbon pyrolyzate adsorbent according to claim 1.

* * * * *